(12) United States Patent
Lin

(10) Patent No.: US 7,200,279 B1
(45) Date of Patent: Apr. 3, 2007

(54) METHOD AND SYSTEM FOR IMAGE CHROMA SUPPRESSION

(75) Inventor: Shang-Hung Lin, San Jose, CA (US)

(73) Assignee: MagnaChip Semiconductor, Inc., Santa Clara, CA (US)

( * ) Notice: Subject to any disclaimer, the term of this patent is extended or adjusted under 35 U.S.C. 154(b) by 819 days.

(21) Appl. No.: 10/660,864

(22) Filed: Sep. 11, 2003

(51) Int. Cl.
G06K 9/40 (2006.01)
G09G 5/02 (2006.01)
H04N 9/64 (2006.01)

(52) U.S. Cl. .................. 382/274; 382/263; 382/300; 345/589; 348/29; 348/273

(58) Field of Classification Search ........ 382/162–167, 382/199, 254, 260, 263, 266, 274, 275, 282, 382/300, 305, 312; 345/589, 593, 597, 604, 345/606, 615, 617; 348/29, 223.1, 246, 251, 348/252, 266, 272, 273, 280, 294
See application file for complete search history.

(56) References Cited

U.S. PATENT DOCUMENTS

| | | | |
|---|---|---|---|
| 4,480,266 A * | 10/1984 | Hashimoto | 348/285 |
| 4,974,066 A * | 11/1990 | Tusji | 348/242 |
| 6,094,508 A * | 7/2000 | Acharya et al. | 382/199 |
| 6,766,281 B1 * | 7/2004 | Vijayakumar et al. | 702/190 |
| 6,829,016 B2 * | 12/2004 | Hung | 348/581 |
| 6,975,354 B2 * | 12/2005 | Glotzbach et al. | 348/273 |
| 7,102,669 B2 * | 9/2006 | Skow | 348/222.1 |
| 7,113,207 B2 * | 9/2006 | Fukui et al. | 348/225.1 |

* cited by examiner

Primary Examiner—Kanjibhai Patel
(74) Attorney, Agent, or Firm—Greenberg Traurig, LLP (57) ABSTRACT

A method and system for image chroma suppression of an image sensor system. Chroma suppression is performed to reduce the false color phenomena. The amount of chroma suppression is performed based on the strength of spatial frequency for a current processing pixel measured during edge detection. In determining the strength of spatial frequency of the current processing pixel, only a small number of green pixel values are needed, regardless of whether or not the current processing pixel is a green pixel within the Bayer pattern. As such, line buffers from the color interpolation module of an image sensor system can also be used for the purpose of chroma suppression.

21 Claims, 5 Drawing Sheets

| M 00 (Green) | M 01 | M 02 (Green) | M 03 |
|---|---|---|---|
| M 10 | M 11 (Green) | M 12 | M 13 (Green) |
| M 20 (Green) | M 21 | M 22 (Green) | M 23 |
| M 30 | M 31 (Green) | M 32 | M 33 (Green) |

Bayer Pattern 300

Figure 3

| M 00 | M 01 (Green) | M 02 | M 03 (Green) |
|---|---|---|---|
| M 10 (Green) | M 11 | M 12 (Green) | M 13 |
| M 20 | M 21 (Green) | M 22 | M 23 (Green) |
| M 30 (Green) | M 31 | M 32 (Green) | M 33 |

Bayer Pattern 400

METHOD AND SYSTEM FOR IMAGE CHROMA SUPPRESSION

FIELD OF THE INVENTION

The invention relates to image sensor chroma suppression, particularly to chroma suppression that relies on spatial frequency information without needing to increase the existing image sensor line buffer size.

BACKGROUND

In demosaicking Bayer pattern images captured by an image sensor, "false color" can be induced at or near places such as an edge, a checkered pattern or a stripe pattern. As such, a need exists for reducing the false color phenomena at or near edges, checkered patterns or stripe patterns.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
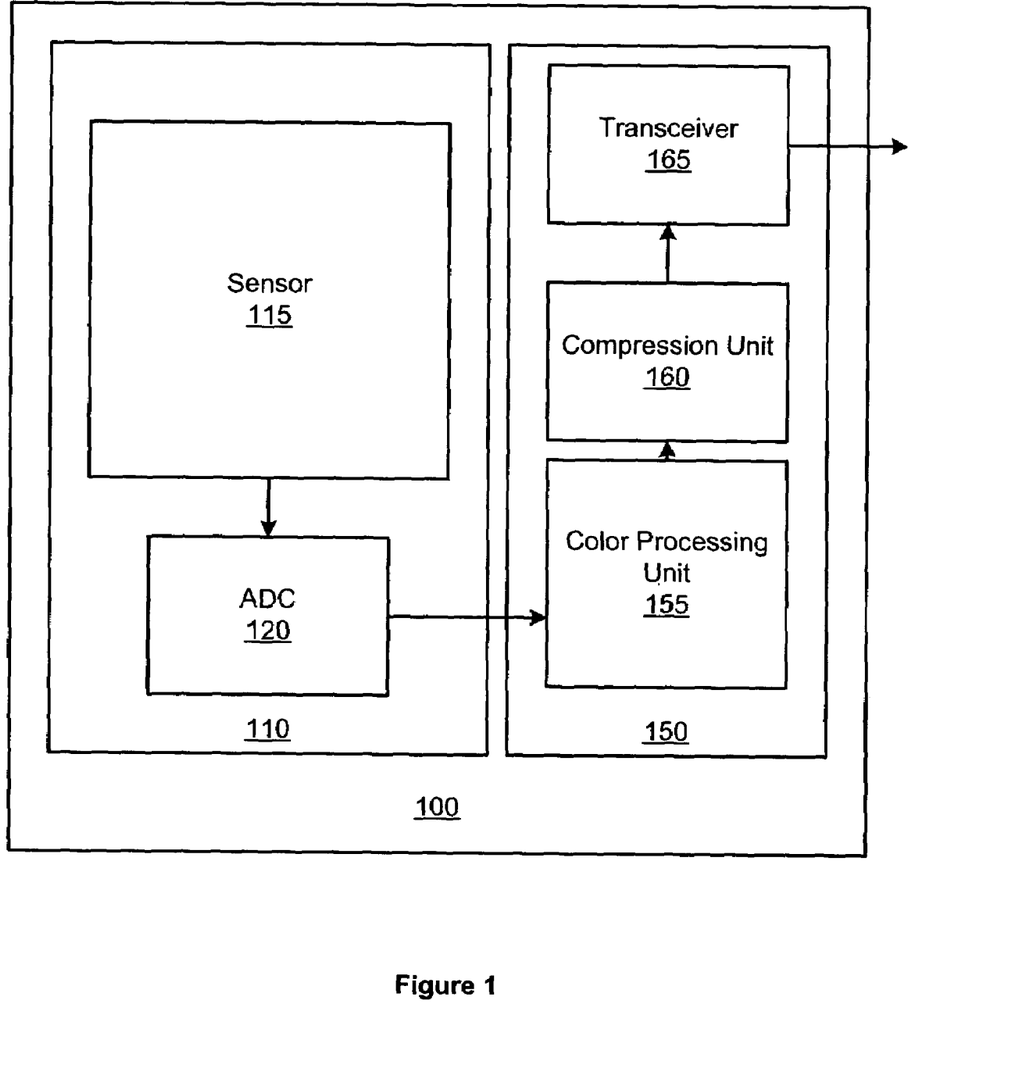
FIG. 1 shows an image sensor chip for chroma suppression in accordance with one embodiment of the invention.

FIG. 1 shows an image sensor chip 100 for chroma suppression in accordance with one embodiment of the invention.

Image sensor chip 100 comprises an image sensor array 110 and an image processing component 150. Image sensor array 110 is adapted for capturing and digitizing images to be processed by image processing component 150. Image sensor chip 100 is typically used within an image-capturing device that could be, but is not limited to, a digital camcorder, a digital still camera, a videophone, a video conferencing equipment, a PC camera, a cell phone, or a security monitor.

Image sensor array 110 comprises an image sensor 115, and an analog-to-digital converter (ADC) 120. Image processing component 150 comprises a color processing component 155, a compression engine 160 and a transceiver 165.

Images are captured by sensor 115, then digitized by ADC 120 into pixel values to be transmitted to image processing component 150. Then, the pixel values are color processed by color processing component 155. Color processing component 155 typically performs digital image processing that could include, but is not limited to, auto exposure control, color interpolation, edge detection, chroma suppression, auto white balancing, color correction and image sharpening. In turn, the color processed pixel values undergo compression performed by compression engine 160. The compressed image data is then transmitted out of image sensor chip by transceiver 165.

Figure 2:
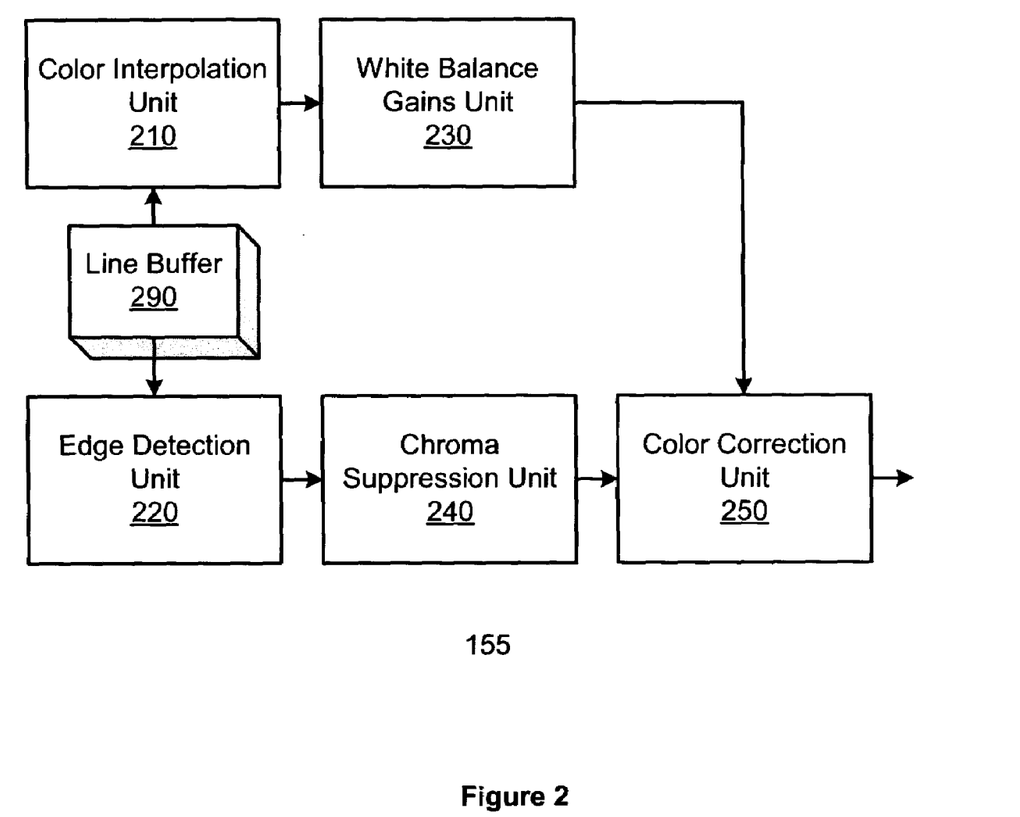
FIG. 2 shows some of the units involved for performing chroma suppression in accordance with one embodiment of the invention.

Referring now to FIG. 2 in view of FIG. 1, FIG. 2 shows units included in color processing component 155 in accordance with one embodiment of the invention. These units comprise a color interpolation unit 210, an edge detection unit 220, a white balance gain unit 230, a chroma suppression unit 240, a color correction unit 250 and a line buffer for color interpolation unit 210.

Specifically, edge detection unit 220 and chroma suppression unit 240 are involved for chroma suppression in accordance with the present embodiment. Furthermore, also shown coupled to both color interpolation unit 210 and edge detection unit is line buffer 290 that is adapted for storing pixel values to be used for performing interpolation of pixel values for a current processing pixel. Line buffer 290 can also to be used for chroma suppression in the present embodiment. As such, in the present embodiment, performing chroma suppression does not require extra line buffers in addition to that of color interpolation unit 210.

Chroma suppression is adapted to reduce false color that occurs at or near an edge, a checkered pattern, or a stripe pattern in an image. As such, before chroma suppression is performed, these problematic locations needing chroma suppression are first identified. In turn, chroma suppression is performed on these problematic locations.

Specifically, in the present embodiment, edge detection unit 220 is adapted to indicate whether a current processing pixel is at or near an edge, a checkered pattern, or a stripe pattern. A pixel at or near these problematic image patterns typically has high spatial frequency. As such, edge detection unit 220 is adapted to determine whether the current processing pixel is in a high spatial frequency region or not in order to determine whether the current processing pixel is at or near an edge, a checkered, pattern, or a stripe pattern. If the current processing pixel is in a high spatial frequency region, then chroma suppression unit 240 is triggered to perform chroma suppression at the current processing pixel by reducing the intensity of the current processing pixel. The degree of intensity reduction can be flexibly adjusted.

More specifically, edge detection unit 220 is adapted to detect the presence of an edge, a checkered pattern, or a strip pattern without having to use pixel values other than some of pixel values already available in line buffer 290, wherein pixels values in line buffer 290 are originally intended for performing color interpolation by color interpolation unit 210. In so doing, no extra line buffer besides line buffer 290 is required by edge detection unit 220 in locating problematic locations in an image. As such, in the present embodiment, chroma suppression can be performed without extra line buffer besides line buffer 290.

Moreover, edge detection unit 220 does not require any non-green pixel values in determining spatial frequency of the current processing pixel. Whether the current processing pixel is a green pixel or not, edge detection unit 220 can use pixel values of green pixels that surround the current processing pixel.

Figure 3:
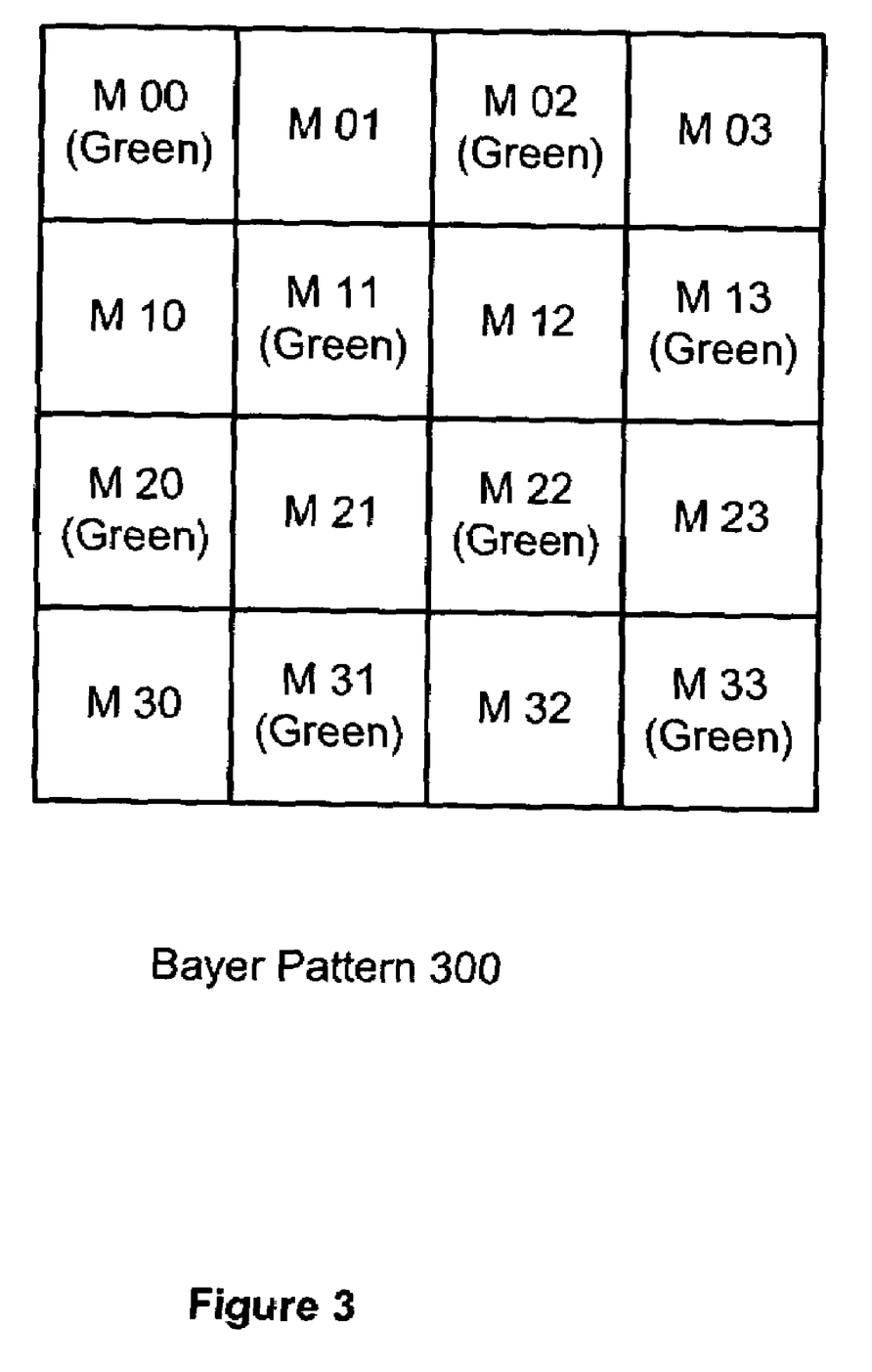
FIG. 3 shows a Bayer pattern having a green current processing pixel in accordance with one embodiment of the invention.

In view of FIGS. 1–2, FIG. 3 shows a Bayer pattern 300 having a green current processing pixel M22 that might undergo chroma suppression in accordance with one embodiment of the invention.

Bayer pattern 300 comprises 16 pixels (M00, M01, . . . and M33) as shown, wherein green pixel M22 is the current processing pixel. These 16 pixels are already available for access from line buffer 290 because they are also used by color interpolation unit 210 for performing color interpolation.

Specifically, pixels M00–M33 are arranged as a 4 by 4 Bayer pattern having green pixel M22 as current processing pixel. As such, besides current processing pixel M22 being a green pixel, its surrounding pixels M00, M02, M11, M13, M20, M22, M31 and M33 are also green pixels.

Continuing with FIG. 3, given a current processing pixel like green pixel M22, edge detection unit 220 uses the surrounding green pixels (i.e., M00, M02, M11, M13, M20, M31 and M33) of green pixel M22 to determine whether current processing pixel M22 is in a high frequency region or not. If current processing green pixel M22 is found to be in a high frequency region, then chroma suppression is performed on current processing pixel M22 by chroma suppression unit 240, thereby reducing undesirable false color.

Within Bayer pattern 300, only the values of green pixels surrounding current processing pixel M22 need to be used by edge detection unit 220 in determining whether chroma suppression is to be performed or not. As these green pixel values are already accessible from line buffer 290, edge detection unit 220 can share the same line buffer 290 with color interpolation unit 210.

As understood herein, the invention need not be limited to using only green pixels surround green pixel M22. For example, in another embodiment, values of non-green pixels (stored in line buffer 290) surrounding green pixel M22 are used.

Also, as understood herein, the Bayer pattern used need not be limited to a 4×4 block. For example, in another embodiment, a 5×5 block is used.

Figure 4:
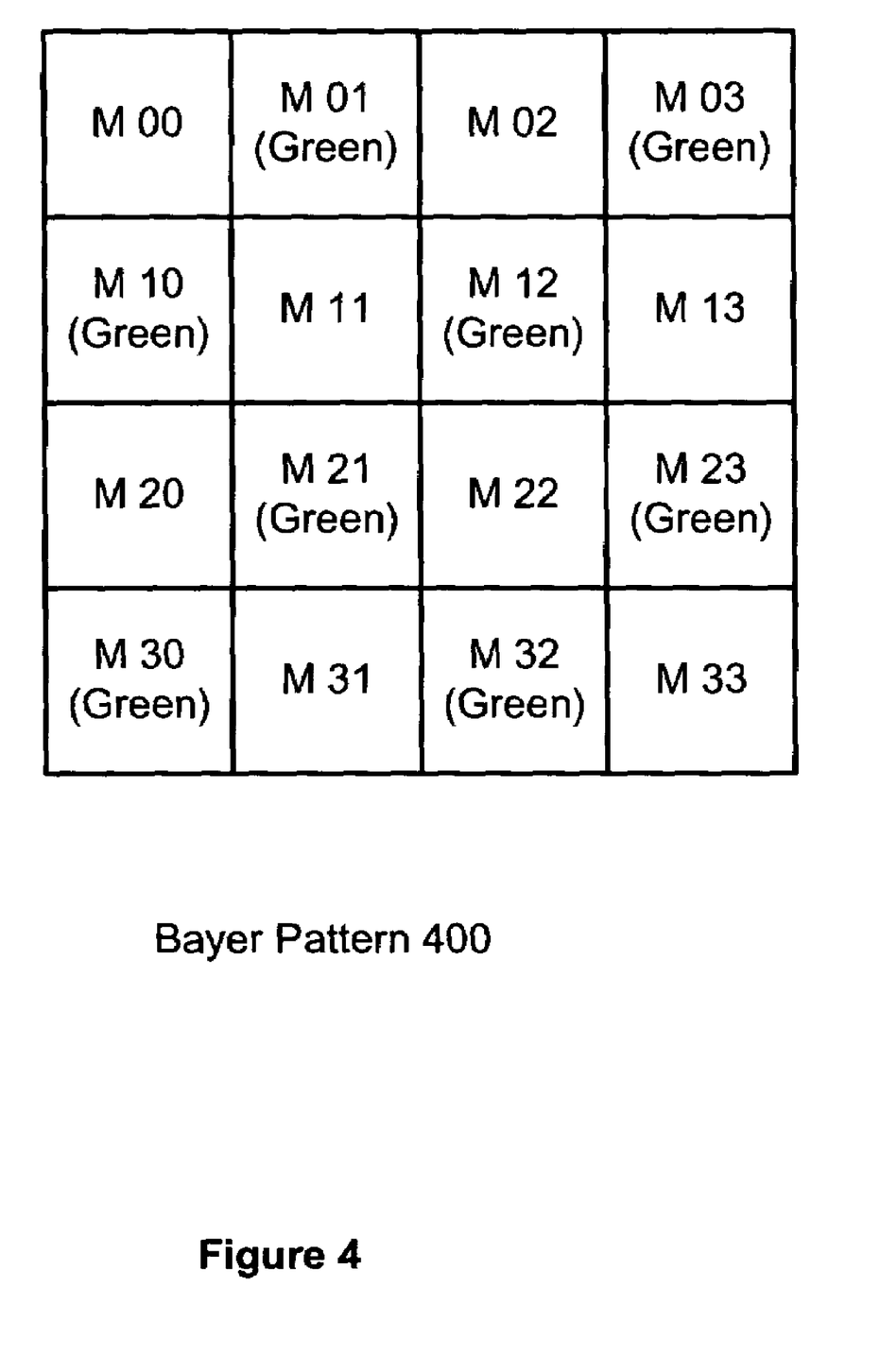
FIG. 4 shows another Bayer pattern having a non-green current processing pixel in accordance with one embodiment of the invention.

In view of FIGS. 1–2, FIG. 4 shows another Bayer pattern 400 having a non-green pixel M22 as a current processing pixel that might undergo chroma suppression in accordance with one embodiment of the invention.

Bayer pattern 400 comprises 16 pixels (M00, M01, . . . and M33), wherein M22 is a current processing pixel. These 16 pixels are already available for access from line buffer 290 because they are also used by color interpolation unit 210 for performing color interpolation.

Specifically, pixels M00–M33 are arranged as a 4 by 4 Bayer pattern having a non-green (i.e., blue or red) pixel as current processing pixel M22. As such, because current processing pixel M22 is a non-green pixel, its surrounding pixels M10, M30, M01, M21, M12, M32, M03 and M23 are green pixels.

Continuing with FIG. 4, given a current processing pixel like non-green pixel M22, edge detection module 220 uses the surrounding green pixels (i.e., M0, M30, M01, M21, M12, M32, M03 and M23) of non-green current processing pixel M22 to determine whether current processing pixel M22 is in a high frequency region or not. If current processing non-green pixel M22 is found to be in a high frequency region, then chroma suppression is performed on current processing pixel M22 by chroma suppression module 240, thereby reducing undesirable false color.

Within Bayer pattern 400, only green pixels surrounding non-green current processing pixel M22 need to be used by edge detection unit 220 in determining whether chroma suppression is to be performed or not. As these green pixel values are already accessible from line buffer 290, edge detection unit 220 can share the same line buffer 290 with color interpolation unit 210.

As understood herein, the invention need not be limited to using only green pixels surround green pixel M22. For example, in another embodiment, values of non-green pixels (stored in line buffer 290) surrounding non-green pixel M22 are used.

Also, as understood herein, the Bayer pattern used need not be limited to a 4×4 block. For example, in another embodiment, a 5×5 block is used.

Figure 5:
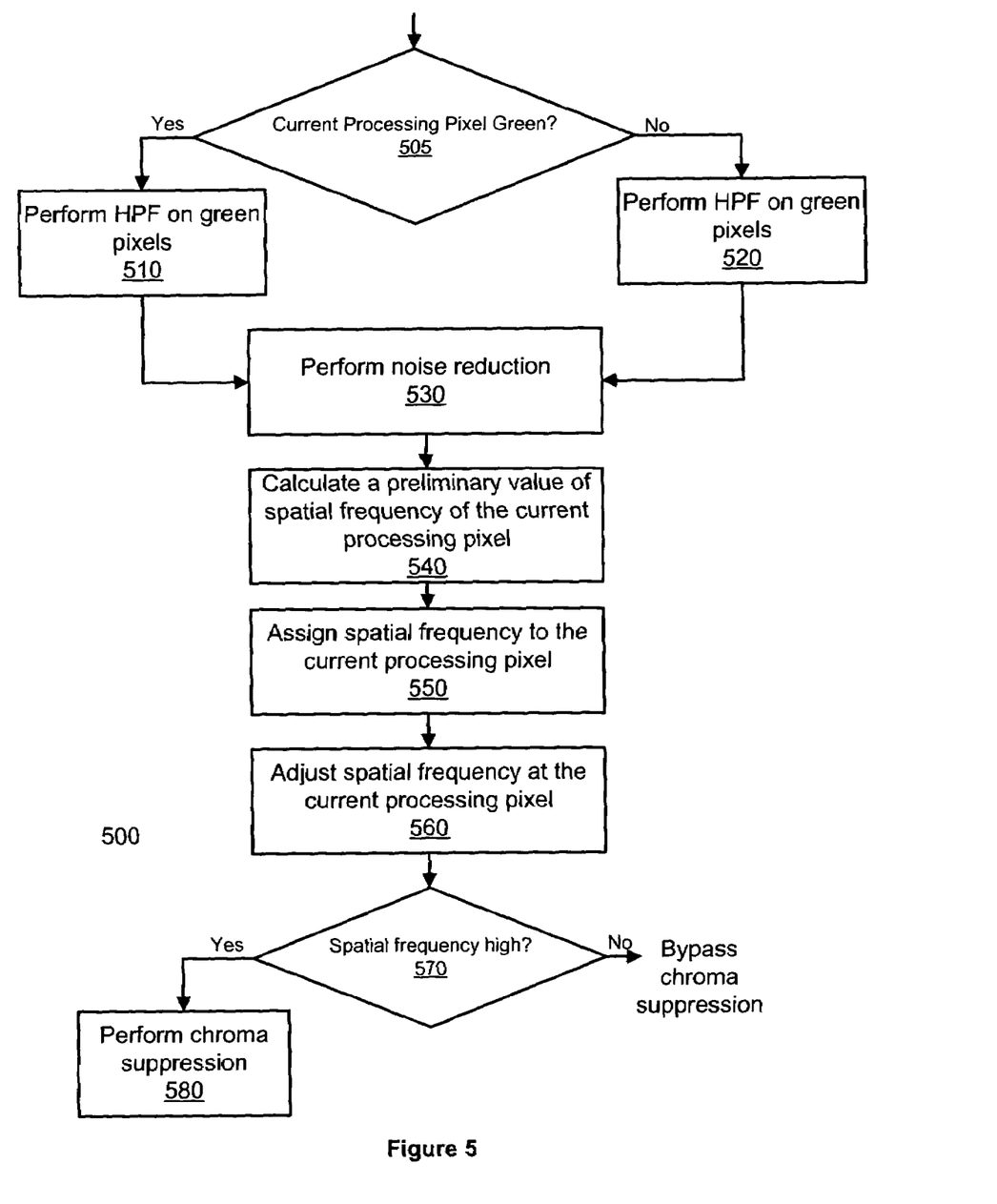
FIG. 5 is flow chart that outlines steps for performing chroma suppression in accordance with one embodiment of the invention.

In view of FIGS. 3–4, FIG. 5 shows a flow chart 500 outlining steps for performing chroma suppression in accordance with one embodiment of the invention.

In query step 505, a check is made to determine if a current processing pixel M22 within a 4×4 Bayer pattern (as shown in FIGS. 3 and 4) is a green pixel or non-green pixel. If M22 is a green pixel, then Bayer pattern to be examined is Bayer pattern 300 shown in FIG. 3. In turn, step 510 is performed next. Otherwise, if M22 is a non-green pixel, then Bayer pattern to be examined is Bayer pattern 400 shown in FIG. 4. In turn, step 520 is performed next.

In step 510 (for M22 being a green pixel), high pass filtering is performed on green pixels surrounding the current processing pixel M22.

Specifically, the first order pixel value sums are calculated before the spatial frequency of green pixel M22 is calculated. These first order pixel value sums are calculated with the green pixel values (i.e., M00, M20, M11, M31, M02, M22, M13, M33) within the Bayer pattern (see Bayer pattern 300 of FIG. 3).

First, a first plurality of 4 first order pixel value sums V[0] to V[3] are calculated, wherein for i=0 to 3 an i-th pixel value sum V[i] characterizes the pixel value sum for a pair of buffered green pixel values associated respectively with a pair of green pixels lying on the i-th vertical column of the Bayer pattern region. V[i] can be considered as an "average" of pixel values for the two green pixels lying in the i-th column of the Bayer pattern region.

Second, a second plurality of 4 first order pixel value sums H[0] to H[3] are calculated, wherein for j=0 to 3 an j-th pixel value sum H[j] characterizes the pixel value sum for a pair of buffered green pixel values associated respectively with a pair of green pixels lying in the j-th horizontal column of said Bayer pattern region. H[j] can be considered as an "average" of pixel values for the two green pixels lying in the j-th column of the Bayer pattern region.

Specifically, before the spatial frequency of green pixel M22 is calculated, the first order pixel value sums are calculated as follow:

$V[0]=(M00+M20)$ as an "average" of values of $M00$ and $M20$;

$V[1]=(M11+M31)$ as an "average" of values of $M11$ and $M31$;

$V[2]=(M02+M22)$ as an "average" of values of $M02$ and $M22$;

$V[3]=(M13+M33)$ as an "average" of values of $M13$ and $M33$;

$H[0]=(M00+M02)$ as an "average" of values of $M00$ and $M02$;

$H[1]=(M11+M13)$ as an "average" of values of $M11$ and $M13$;

$H[2]=(M20+M22)$ as an "average" of values of $M20$ and $M22$; and $H[3]=(M31+M33)$ as an "average" of values of $M31$ and $M33$.

In turn, step 530 is performed next.

In step 520 (for M22 being a non-green pixel), high pass filtering is performed on green pixels surrounding the current processing pixel M22.

Specifically, before the spatial frequency of non-green pixel M22 is calculated, the first order pixel value sums are calculated before the spatial frequency of non-green pixel M22 is calculated. These first order pixel value sums are calculated with the green pixels (i.e., M0, M30, M01, M21, M12, M32, M03, M23, M01, M03, M0, M12, M21, M23, M30 and M32) within the Bayer pattern (see Bayer pattern 400 of FIG. 4).

First, a first plurality of 4 first order pixel value sums V[0] to V[3] are calculated, wherein for i=0 to 3 an i-th pixel value sum V[i] characterizes the pixel value sum for a pair of buffered green pixel values associated respectively with a pair of green pixels lying on the i-th vertical column of said Bayer pattern region. V[i] can be considered as an "average" of pixel values for the two green pixels lying in the i-th column of the Bayer pattern region.

Second, a second plurality of 4 first order pixel value sums H[0] to H[3] are calculated, wherein for j=0 to 3 an j-th pixel value sum H[j] characterizes the pixel value sum for a pair of buffered green pixel values associated respectively with a pair of green pixels lying in the j-th horizontal column of said Bayer pattern region. H[j] can be considered as an "average" of pixel values for the two green pixels lying in the j-th column of the Bayer pattern region.

Specifically, before the spatial frequency of green pixel M22 is calculated, the first order pixel value sums are calculated as follow:

$V[0]=(M10+M30)$ as an "average" of values of $M10$ and $M30$;

$V[1]=(M01+M21)$ as an "average" of values of $M01$ and $M21$;

$V[2]=(M12+M32)$ as an "average" of values of $M12$ and $M32$;

$V[3]=(M03+M23)$ as an "average" of values of $M03$ and $M23$;

$H[0]=(M01+M03)$ as an "average" of values of $M01$ and $M03$;

$H[1]=(M10+M12)$ as an "average" of values of $M10$ and $M12$;

$H[2]=(M21+M23)$ as an "average" of values of $M21$ and $M23$; and $H[3]=(M30+M32)$ as an "average" of values of $M30$ and $M32$.

In turn, step 530 is performed next.

In step 530, noise reduction is performed.

Specifically, the second order pixel value differences are calculated from the first order pixel value differences calculated either in step 510 (for M22 being a green pixel) or in step 520 (for M22 being a non-green pixel).

More specifically, the second order pixel value sums are calculated as follow:

$V0\text{avg}=(V[0]+V[2])$ as an "average" of $V[0]$ and $V[2]$;

$V1\text{avg}=(V[1]+V[3])$ as an "average" of $V[1]$ and $V[3]$;

$H0\text{avg}=(H[0]+H[2])$ as an "average" of $H[0]$ and $H[2]$; and $H1\text{avg}=(H[1]+H[3])$ as an "average" of $H[1]$ and $H[3]$.

In step 540, preliminary values of spatial frequency for the current processing pixel are calculated. These preliminary values are the third order pixel value differences as calculated from the second pixel value sums calculated in step 530.

Specifically, the third order pixel value differences are calculated as follow:

$V\text{max}=|V0\text{avg}-V1\text{avg}|$ as a preliminary value of spatial frequency; and $H\text{max}=|H0\text{avg}-H1\text{avg}|$ as a preliminary value of spatial frequency.

Vmax and Hmax will be used in determining whether or not current processing pixel M22 is near an edge, a checkered pattern, or a stripe pattern, and thus in a high spatial frequency region.

In step 550, a spatial frequency value SF[1] is assigned to current processing pixel M22. Specifically, SF[1] is defined as:

$SF[1]=\text{MAX}(V\text{max}, H\text{max})$.

In step 560, noise reduction is performed on current processing pixel M22 by fine-tuning spatial frequency SF[1] obtained in step 550. This noise reduction step adjusts the spatial frequency as follow:

$SF[2]=\text{MIN}(255, \text{MAX}(0, (SF-T)))$.

As understood herein, the quantity SF[2] indicates if current processing pixel M22 is in a high spatial frequency region or not. Specifically, large value of SF[2] indicates higher spatial frequency for current processing pixel M22. T is a parameter for tolerating low spatial deviation, wherein the range of T is from 0 to 255. Again, whether step 530 is performed following step 510 or step 520, only pixel values of green pixels (already available from the line buffer used for interpolation) need to be used in determining the degree of spatial frequency intensity for current processing pixel M22. As such, exiting line buffer space of the color interpolation unit of an image sensor can be used. In turn, in evaluating whether or not M22 is in a high spatial frequency region in need of chroma suppression, the same line buffers in the color interpolation unit of an image sensor can be used for the purpose of chroma suppression.

As understood herein, the invention is not limited to the formula listed in step 505–550 of the present embodiment. The above listed formula and their associated numerical values are for demonstrate purpose only. For example, in another embodiment of the invention, other numerical values can be used in place of the numerical values listed in steps 505–570.

In query step 570, a test is made to check if SF[2] indicates current processing pixel M22 as being in a high spatial frequency region. If yes, then step 580 is performed. Otherwise, step 580 is bypassed.

Specifically, SF[2] is compared to a threshold value T. If SF[2]>T, then SF[2] indicates that M22 is in a high spatial frequency region.

In step 580, chroma suppression is performed on current processing pixel M22 in accordance with the strength of SF[2] as calculated in step 560. Specifically, chroma suppression is performed by reducing the chromatic saturation of current processing pixel M22.

Assuming the spatial frequency of M22 is greater than the threshold (i.e., SF[2]>T), an attenuation factor F for chroma suppression is given as F=MIN(255, MAX(0,255−SF[2]*W)), wherein W is a parameter that quantifies the strength of chroma suppression.

Then, transformation from RGB space to YUV space is performed as follow:

$Y=(77*R+150*G+29*B)/256;$ $U=(-44*R-87G+131*B)/256;$ and $V=(131*R-110*G-21*B)/256.$ As understood herein, Y is the luminance of the current processing pixel. U and V are the chroma components of current processing pixel M22, wherein U and V are used to determine the original chromatic saturation of current processing pixel M22. Moreover, because chroma suppression is understood to be the reduction of the original chromatic saturation of the current processing pixel, chroma suppression is performed by reducing U and V respectively into U' and V', wherein U' and V' are used to determine a new chromatic saturation for current processing pixel M22. In so doing, the new chromatic saturation determined from U' and V' is reduced relative to the original chromatic saturation, thereby achieving chromatic suppression for current processing pixel M22.

Continuing with step 580, the attenuation factor F is rescaled as F/256 (i.e., a number between 0 and 1) to perform chroma suppression by reducing U and V as follow:

$U'=U*(F/256);$ and $V'=V*(F/256).$

Again, U' and V' are the reduced chroma components of the current processing pixel. As such, the original chroma saturation of the current processing pixel is reduced to achieve chroma suppression on the current processing pixel.

In turn, transformation from YUV space back to RGB space is performed using reduced U' and V' as follow:

$R=Y+((351*V')/256;$ $G=Y-((178*V'+86*U')/256;$ $B=Y+((443*U')/256.$

As understood herein, chroma suppression in step 580 need not use the listed formula in the present embodiment. The above listed formula and their associated numerical values are for demonstrate purpose only. For example, in another embodiment of the invention, other numerical values can be used in place of the numerical values listed in step 580.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for performing chroma suppression for an image sensor system, said method comprising the steps of:
   a) determining the intensity of spatial frequency for a current processing pixel within a block of Bayer pattern by using edge detection that utilizes pixels values of green pixels within said block of Bayer pattern; and
   b) reducing the chromatic saturation of said current processing pixel based on said determined intensity of spatial frequency of said current processing pixel;
   wherein said region of Bayer pattern is a 4×4 block of pixels containing said current processing pixel;
   wherein said step a) further comprises the steps of:
   a1) calculating a first plurality of 4 first order pixel value sums V[0] to V[3], wherein an i-th pixel value sum V[i] characterizes the pixel value sum for a pair of green pixel values associated respectively with a pair of green pixels lying on the i-th vertical column of said Bayer pattern region; and
   a2) calculating a second plurality of 4 first order pixel value sums H[0] to H[3], wherein an j-th pixel value sum H[j] characterizes the pixel value sum for a pair of green pixel values associated respectively with a pair of green pixels lying in the j-th horizontal column of said Bayer pattern region;
   wherein said step a) further comprises the steps of:
   a3) calculating Vavg[0]=V[0]+V[2] and Vavg[1]=V[1]+V[3];
   a4) calculating Vmax=|Vavg[0]−Vavg[1]|;
   a3) calculating Havg[0]=H[0]+H[2] and Havg[1]=H[1]+H[3]; and
   a4) calculating Hmax=|Havg[0]−Havg[1]|;
   wherein a number GI is used to determine the intensity of spatial frequency of said current processing pixel, wherein said number GI is defined as the greater value of said two values Vmax and Hmax.

2. The method of claim 1, wherein in said step a) said green pixel values are taken from a line buffer adapted for buffering pixel values to be used for performing image interpolation.

3. The method of claim 1, wherein in said step a) the intensity of spatial frequency of said current processing pixel is determined using exclusively said green pixel values.

4. The method of claim 1, wherein in said step b) said number GI is used to set the amount of reduction to be performed on the chromatic saturation of said current processing pixel.

5. A method for performing chroma suppression for an image sensor system,
   said method comprising the steps of:

a) determining whether or not a current processing pixel within a region of Bayer pattern is a green pixel;
b) irrespective of whether said current processing pixel being a green pixel or a non-green pixel, accessing the pixel values of green pixels within said region of Bayer pattern that surround said current processing pixel;
c) calculating the intensity of spatial frequency of said current processing pixel using said accessed green pixel values; and
d) reducing the chromatic saturation of said current processing pixel based on said calculated intensity of spatial frequency;
wherein said step c) is performed during edge detection, wherein said accessed green pixel values are taken from a line buffer adapted for buffering pixel values to be used for performing image interpolation.

6. A chroma suppression system for performing chroma suppression in an image sensor system, said chroma suppression system comprising:
an edge detection module adapted to detect edge within a Bayer pattern region, said edge detection module adapted for determining the intensity of spatial frequency of a current processing pixel by using green pixel values within said Bayer pattern region; and
a chroma suppression module coupled to said edge detection module, said chroma suppression module adapted to reduce the chromatic saturation of said current processing pixel based on said determined spatial frequency intensity of said current processing pixel;
wherein said edge detection module is adapted to perform the steps comprising of:
a) calculating a first plurality of 4 first order pixel value sums V[0] to V[3], wherein an i-th pixel value sum V[i] characterizes the pixel value sum for a pair of green pixel values associated respectively with a pair of green pixels lying on the i-th vertical column of said Bayer pattern region; and
b) calculating a second plurality of 4 first order pixel value sums H[0] to H[3], wherein an j-th pixel value sum H[j] characterizes the pixel value sum for a pair of green pixel values associated respectively with a pair of green pixels lying in the j-th horizontal column of said Bayer pattern region;
wherein said region of Bayer pattern is a 4×4 block of pixels containing said current processing pixel;
wherein said edge detection module is further adapted to perform the steps comprising of:
c) calculating Vavg[0]=V[0]+V[2] and Vavg[1]=V[1]+V[3];
d) calculating Vmax=|Vavg[0]−Vavg[1]|;
e) calculating Havg[0]=H[0]+H[2] and Havg[1]=H[1]+H[3]; and
f) calculating Hmax=|Havg[0]−Havg[1]|;
wherein a number GI is used by said edge detection module to indicate the intensity of spatial frequency of said current processing pixel, wherein said number GI is defined as the greater of said two values Vmax and Hmax.

7. The chroma suppression system of claim 6, wherein said green pixel values are taken from a line buffer of an image interpolation module of said image sensor system, said line buffer adapted for buffering pixel values to be used for performing image interpolation.

8. The chroma suppression system of claim 6, wherein said edge detection module determines the intensity of spatial frequency of said current processing pixel by using exclusively said green pixel values within said Bayer pattern region.

9. The chroma suppression system of claim 6, wherein said number GI is used as a reference by said chroma suppression module for setting the amount of reduction to be performed on the chromatic saturation of said current processing pixel.

10. A method for performing chroma suppression for an image sensor system,
said method comprising the steps of:
a) irrespective of whether a current processing pixel being a green pixel or a non-green pixel, accessing the pixel values of Bayer pattern green pixels within a region of Bayer pattern that contains a current processing pixel;
b) determining the spatial frequency of said current processing pixel using said accessed green pixel values; and
c) reducing the chromatic saturation of said current processing pixel based on said determined spatial frequency of said current processing pixel;
wherein said step b) further comprises the steps of: b1) calculating a first plurality of 4 first order pixel value sums V[0] to V[3], wherein an i-th pixel value sum V[i] characterizes the pixel value sum for a pair of green pixel values associated respectively with a pair of green pixels lying on the i-th vertical column of said Bayer pattern region; and
b2) calculating a second plurality of 4 first order pixel value sums H[0] to H[3], wherein an j-th pixel value sum H[j] characterizes the pixel value sum for a pair of green pixel values associated respectively with a pair of green pixels lying in the j-th horizontal column of said Bayer pattern region;
wherein said region of Bayer pattern is a 4×4 block of pixels containing said current processing pixel;
wherein said step b) further comprises the steps of:
b3) calculating Vavg[0]=V[0]+V[2] and Vavg[1]=V[1]+V[3];
b4) calculating Vmax=|Vavg[0]−Vavg[1]|;
b3) calculating Havg[0]=H[0]+H[2] and Havg[1]=H[1]+H[3]; and
b4) calculating Hmax=|Havg[0]−Havg[1]|;
wherein a number GI is used to determine the intensity of spatial frequency of said current processing pixel, wherein said number GI is defined as the greater of said two values Vmax and Hmax.

11. The method of claim 10, wherein in said step a) said pixel values of said green pixels are taken from a line buffer of an color interpolation module of said image sensor system, said line buffer adapted to buffer pixel values to be used for performing color image interpolation.

12. The method of claim 10, wherein in said step b) the intensity of spatial frequency of said current processing pixel is calculated using exclusively said green pixel values from said region of Bayer pattern.

13. The method of claim 10, wherein in said step c) said number GI is used to set the amount of suppression to be performed on said current processing pixel.

14. A method for improving quality of an image captured by an image sensor system, said method comprising the steps of:
a) locating area of said captured image that has spatial frequency higher than a reference value by using edge detection, wherein said edge detection uses a plurality of green pixels surrounding a current processing pixel to determine the intensity of spatial frequency of said current processing pixel; and b) chroma suppressing said located area based on said determined spatial frequency intensity of said current processing pixel wherein said plurality of green pixels are taken from a line buffer of an image interpolation unit of said image sensor system, wherein said line buffer is adapted to buffer pixel values to be used for performing image interpolation.

15. The method of claim 14, wherein said step b) further comprises the step of:

reducing the chromatic saturation of said current processing pixel based on the said determined spatial frequency intensity of said current processing pixel.

16. A method for performing chroma suppression for an image sensor system, said method comprising the steps of:

a) finding the intensity of spatial frequency for a current processing pixel within a block of Bayer pattern by using a plurality of green pixel values from said block of Bayer pattern, said green pixel values selected from pixel values adapted to be used for image interpolation; and b) suppressing the chromatic saturation of said current processing pixel based on said found intensity of spatial frequency of said current processing pixel;

wherein said region of Bayer pattern is a 4×4 block of pixels containing said current processing pixel;

wherein said step a) further comprises the steps of:

a1) calculating a first plurality of 4 first order pixel value sums V[0] to V[3], wherein an i-th pixel value sum V[i] characterizes the pixel value sum for a pair of green pixel values associated respectively with a pair of green pixels lying on the i-th vertical column of said Bayer pattern region; and a2) calculating a second plurality of 4 first order pixel value sums H[0] to H[3], wherein an j-th pixel value sum H[j] characterizes the pixel value sum for a pair of green pixel values associated respectively with a pair of green pixels lying in the j-th horizontal column of said Bayer pattern region;

wherein said step a) further comprises the steps of:

a3) calculating Vavg[0]=V[0]+V[2] and Vavg[1]=V[1]+V[3];

a4) calculating Vmax=|Vavg[0]−Vavg[1]|;

a3) calculating Havg[0]=H[0]+H[2] and Havg[1]=H[1]+H[3]; and a4) calculating Hmax=|Havg[0]−Havg[1]|;

wherein a number GI is used to determine the intensity of spatial frequency of said current processing pixel, wherein said number GI is defined as the greater value of said two values Vmax and Hmax.

17. The method of claim 16, wherein said plurality of green pixel values are taken from a line buffer adapted for buffering pixel values to be used for image interpolation.

18. The method of claim 16, wherein in said step a) the intensity of spatial frequency of said current processing pixel is determined using steps performed for edge detection, wherein said edge detection steps utilize pixels values of said green pixels within said block of Bayer pattern.

19. The method of claim 18, wherein in said step a) the intensity of spatial frequency of said current processing pixel is determined using exclusively said buffered green pixel values.

20. The method of claim 16, wherein in said step b) said GI is used to set the amount of suppression to be performed on said current processing pixel.

21. A chroma suppression system for performing chroma suppression in an image sensor system, said chroma suppression system comprising:

an edge detection unit adapted for detecting false color of a current processing pixel by using the intensity of spatial frequency of said current processing pixel; and a chroma suppression unit coupled to said edge detection unit, said chroma suppression unit adapted for reducing the chromatic saturation of said current processing pixel in response to false color being detected for said current processing pixel, wherein the amount of chromatic saturation reduction is performed according to the intensity of spatial frequency of said current processing pixel;

wherein said intensity of spatial frequency of said current processing pixel is determined without needing to use pixel values of non-green pixels surrounding said current processing pixel;

wherein said intensity of spatial frequency of said current processing pixel is determined using green pixel values of a plurality of green pixels surrounding said current processing pixel, said green pixel values taken from a line buffer adapted for buffering pixel values to be used for performing image interpolation.

* * * * *

UNITED STATES PATENT AND TRADEMARK OFFICE
CERTIFICATE OF CORRECTION

PATENT NO. : 7,200,279 B1 Page 1 of 1
APPLICATION NO. : 10/660864
DATED : April 3, 2007
INVENTOR(S) : Shang-Hung Lin It is certified that error appears in the above-identified patent and that said Letters Patent is hereby corrected as shown below:

Column 10, line 31
Change "HI3]" to read -- H[3] --

Column 11, line 31
Change "Vii]" to read -- V[i] --

Signed and Sealed this

Tenth Day of June, 2008

JON W. DUDAS
*Director of the United States Patent and Trademark Office*